April 7, 1953   J. C. HILLYER ET AL   2,634,300
PRODUCTION OF UNSATURATED MONOFLUORIDES
Filed Nov. 26, 1948
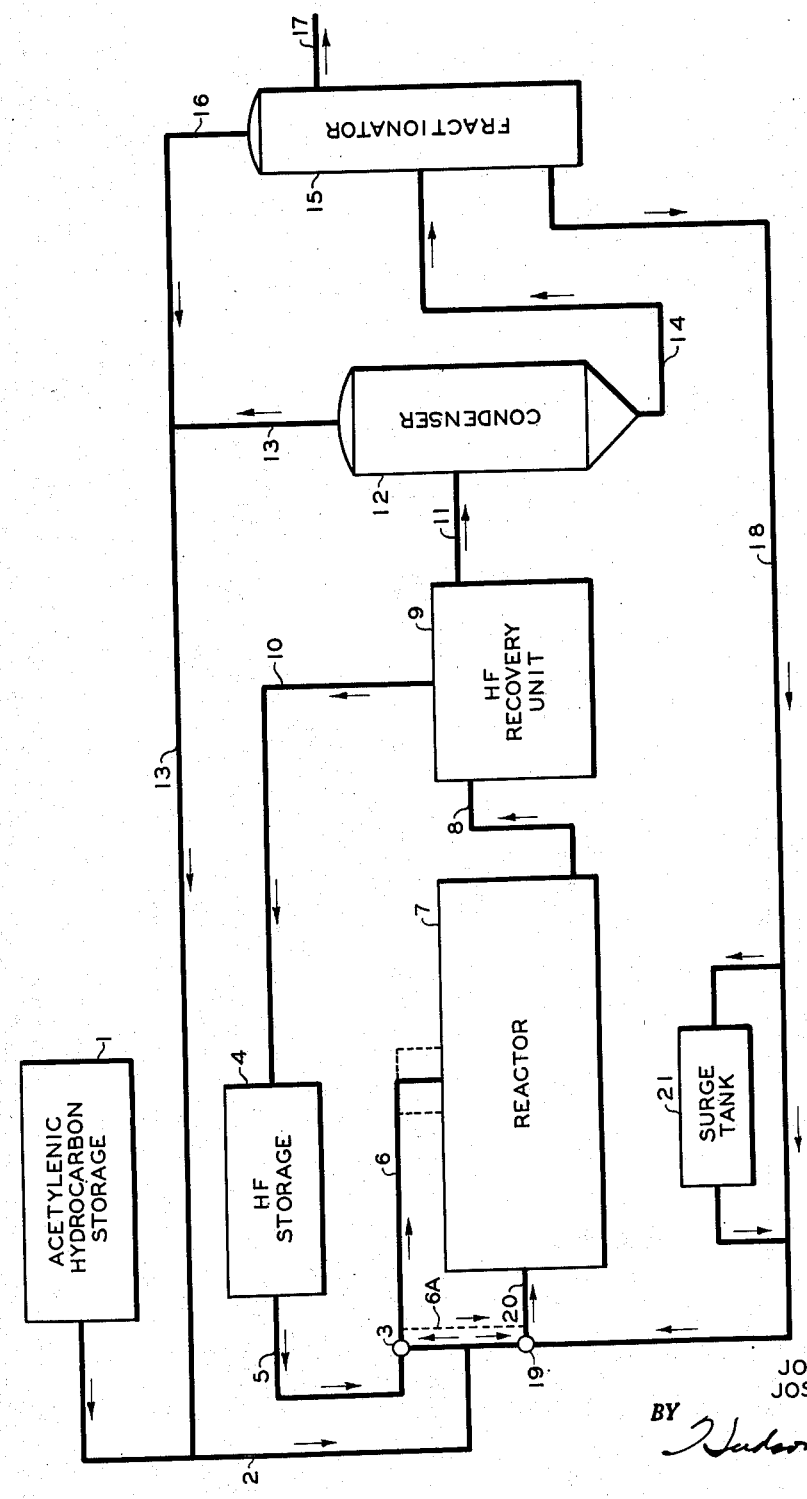
INVENTOR.
JOHN C. HILLYER
JOSEPH F. WILSON
BY *Hudson and Young*
ATTORNEYS Patented Apr. 7, 1953

2,634,300

UNITED STATES PATENT OFFICE 2,634,300

PRODUCTION OF UNSATURATED MONOFLUORIDES

John C. Hillyer and Joseph F. Wilson, Bartlesville, Okla., assignors to Phillips Petroleum Company, a corporation of Delaware Application November 26, 1948, Serial No. 61,948

6 Claims. (Cl. 260—653)

This invention relates to a process for the production of unsaturated organic monofluorides. In one of its aspects this invention relates to a process wherein hydrogen fluoride is reacted with an acetylenic hydrocarbon to form an unsaturated monofluoride. In one of its more particular aspects this invention relates to a process for the production of unsaturated organic monofluorides from an acetylenic hydrocarbon and hydrogen fluoride wherein the saturated difluorides that are produced during the reaction are recycled to the reaction zone to react with the acetylenic hydrocarbon and to produce additional unsaturated monofluorides.

When an acetylenic hydrocarbon is reacted with hydrogen fluoride over a hydrofluorination catalyst such as alumina, bauxite, aluminum fluoride and the like, the product usually comprises a mixture of a saturated gem-difluoralkane with an unsaturated monofluoride containing the same number of carbon atoms to the molecule as the acetylenic hydrocarbon. Since both these products have valuable commercial uses and their separation can be readily effected, such a process has numerous advantages. In our copending application, Serial No. 792,832, filed December 19, 1947, now Patent No. 2,471,525, dated May 31, 1949, of which this application is a continuation-in-part, relating to the production of a mixture of vinyl fluoride with 1,1-difluoroethane by the hydrofluorination of acetylene, such a process is disclosed. However, due to their valuable properties as monomers or comonomers in the production of vinyl resins as well as other important applications, it would often be desirable to produce the unsaturated monofluorides alone, without diversion of starting material to the concomitant production of gem-difluoroalkanes. One method for effecting such conversion lies in separating the gem-difluoroalkane from the reaction mixture obtained from hydrofluorination of an acetylenic hydrocarbon and subjecting it to further treatment in a second reactor whereby the gem-difluoroalkane is converted to an unsaturated monofluoride. A method for such conversion of gem-difluoroalkane is disclosed in copending application of Schulze and Hillyer, Serial No. 62,243, filed November 26, 1948. However, in such a two step operation, considerable added equipment is required with correspondingly increased operating costs.

It is an object of this invention to produce unsaturated organic monofluorides by the interaction of acetylenic hydrocarbons with hydrogen fluoride.

Another object of this invention is to effect the interaction of acetylenic hydrocarbons with hydrogen fluoride in such a manner that unsaturated monofluorides form the principal reaction product.

A further object of this invention is to react acetylenic hydrocarbons with hydrogen fluoride and to return saturated difluorides produced during the reaction to the reaction zone to react further with the acetylenic hydrocarbons and thus form unsaturated monofluorides as the principal reaction product.

A further object of this invention is to react acetylenic hydrocarbons with hydrogen fluoride and acetylenic hydrocarbons with gem-difluoroalkanes in the same reaction zone in such a manner that unsaturated monofluorides are the principal reaction product.

Additional objects will be readily apparent from our disclosure hereinbelow.

We have found that acetylenic hydrocarbons can be converted substantially completely to the corresponding unsaturated monofluorides continuously in a single reactor, such losses as are incurred being principally caused by mechanical reasons. When operating according to our method, a reactor charged with a solid type contact catalyst is fed with streams comprising mixtures of an acetylenic hydrocarbon with hydrogen fluoride and with a gem-difluoroalkane respectively. In the reactor two reactions proceed concurrently, the one between the acetylenic hydrocarbon and hydrogen fluoride and the other between the acetylenic hydrocarbon and the gem-difluoroalkane. In the first reaction, that of hydrofluorination, the acetylenic hydrocarbon is converted to an unsaturated monofluoride and a gem-difluoroalkane. In the second reaction, that of reversion, the gem-difluoroalkane is reacted with the acetylenic hydrocarbon to produce an unsaturated monofluoride. Effluent from the reactor comprises, in addition to unreacted hydrogen fluoride and acetylenic hydrocarbon, unsaturated monofluoride and gem-difluoroalkane. This mixed effluent is discharged through a hydrogen fluoride removal unit to a condensation and fractionation unit where unreacted acetylenic hydrocarbon is removed overhead for recycle to the reaction and unsaturated monofluoride is discharged as product. Gem-difluoroalkane remaining as bottoms from the fractionation is admixed with acetylenic hydrocarbon and recycled to the catalyst zone.

Our invention can be more readily understood by reference to the attached drawing of flow sheet which will be described in detail hereinbelow. Such conventional equipment as pumps, valves, etc. has not been included in this drawing in order to facilitate the understanding of our invention, but a process that includes such equipment is not beyond the scope of our invention.

The acetylenic hydrocarbons that we prefer to use to carry out our invention are those hydrocarbons having an acetylenic carbon-to-carbon linkage or triple bond. Typical examples are acetylene, methylacetylene, ethylacetylene, dimethylacetylene, etc. Although less preferable, we can use those acetylenic hydrocarbons containing an acetylenic triple bond and an olefinic double bond within the hydrocarbon molecule. An example of this less preferred type is hexene-5-yne-1. We prefer to use acetylenic hydrocarbons having no more than 10 carbon atoms per molecule, however, this is merely a preference and not a critical limitation. The acetylenic hydrocarbons are reacted with hydrogen fluoride in such a manner that one or two molecules of hydrogen fluoride add to the unsaturated carbon atoms of one molecule of the acetylenic hydrocarbon, and, as a consequence, products of this addition reaction comprise essentially unsaturated monofluorides having an olefinic carbon-to-carbon linkage wherein the fluoride radical is attached to one of the unsaturated carbon atoms and gem-difluoralkanes which are saturated hydrocarbons containing two fluoride radicals or substituent groups attached to one of the carbon atoms in the molecule. These products of the addition reaction will contain carbon atoms corresponding in number to the acetylenic hydrocarbons. In a specific aspect acetylene is reacted with hydrogen fluoride to produce vinyl fluoride and 1,1-difluoroethane. The gem-difluoroalkane thus-produced reacts with acetylenic hydrocarbons to form unsaturated organic monofluorides, and in our process we separate the gem-difluoroalkane produced in the hydrofluorination reaction from the organic monofluoride and recycle the gem-difluoroalkane to the reaction mixture containing hydrogen fluoride and acetylenic hydrocarbon. The gem-difluoroalkane and acetylenic hydrocarbon react to form additional quantities of the organic monofluoride. In a specific aspect, 1,1-difluoroethane resulting from the interaction of hydrogen fluoride and acetylene is recycled to the reaction zone to produce vinyl fluoride in addition to that resulting from the hydrofluorination reaction.

In practicing our invention we prefer to use a catalyst that essentially comprises alumina or aluminum fluoride, but other catalysts may be used. For example, alumina combined with fluorides of such metals as aluminum, antimony, cobalt, cadmium and zinc are particularly useful as catalysts. If desired, the alumina may be used as a support for the metallic fluorides. The catalyst is preferably in either a pelleted or a granular form, and it may be employed as a fixed bed of coarse granules, as a bed of finely divided particles in ebullient motion in a stream of upward flowing reactants, or as a stream of finely divided particles passing through a reaction zone.

We have found that the molar ratio of acetylenic hydrocarbon to hydrogen fluoride for the hydrofluorination reaction should be within the range of 1:1 to 1:4. Also, in the feed stream for the reversion reaction or the dehydrofluorination of the gem-difluoroalkane the molar ratio of acetylenic hydrocarbon to gem-difluoroalkane should be within the range of 1:1 to 3:1. For both reactions the most preferable ratio is a mol-for-mol ratio, i. e. the feed stream containing the hydrofluorination reactants has a molar ratio of acetylenic hydrocarbon to hydrogen fluoride of 1:1 and the feed stream for the dehydrofluorination reaction has a molar ratio of acetylenic hydrocarbon to gem-difluoroalkane of 1:1.

The preferred temperature for effecting our process is within the range of 350 to 750° F. and more preferably within the range of 450 to 650° F. The pressure is usually substantially atmospheric, but higher and lower pressures may be used, if desired.

The optimum flow rates for the reaction between the acetylenic hydrocarbon and the hydrogen fluoride are within the range of 100 to 350, preferably from 150 to 210, volumes of reactants per volume of catalyst per hour. For the reaction between the gem-difluoroalkane and the acetylenic hydrocarbon the optimum flow rates are from 50 to 250, preferably from 75 to 150, volumes of reactants per volume of catalyst per hour. Since the optimum flow rates for the two reactions that are effected in the reactor of our process vary substantially, we usually prefer to introduce the two reaction mixtures into the reactor at different points in the reactor. These points of introduction are so located in the reactor that the depth of catalyst passed through by the acetylenic hydrocarbon-hydrogen fluoride mixture is less than that passed through by the gem-difluoroalkane-acetylenic hydrocarbon mixture by an amount which is inversely proportional to the difference in optimum flow rates. The point for introduction of the acetylenic hydrocarbon-hydrogen fluoride mixture for the hydrofluorination reaction is intermediate the point of introduction of the gem-difluoroalkane-acetylenic hydrocarbon for the reversion reaction and the point at which the reaction products are withdrawn from the reactor. In order to compensate for variations in the rates of reaction we provide means (as shown by the dotted lines on the drawing) for adjusting the point of entrance of the hydrofluorination mixture to the reactor. In an alternative method of operation the two reaction mixtures may be introduced to the reactor at the same point, and, when so operating, the flow rates are adjusted to maintain them within the optimum limits by controlling the rate of feed of either the hydrogen fluoride or the gem-difluoroalkane.

Referring to the accompanying drawing, acetylenic hydrocarbon from storage 1 is conveyed via line 2 to mixing apparatus 3 which may be a high velocity jet or other suitable mixing device where it is commingled with hydrogen fluoride drawn from storage 4 via line 5. The resulting mixture passes via line 6 into reactor 7 where it contacts a suitable catalyst at conditions more fully described hereinabove. The dotted lines connecting line 6 and reactor 7 indicate alternative points of introduction of the reaction mixture in order to vary the flow rate of the reactants through the bed of catalyst in the reactor. The effluent from reactor 7, which contains the unsaturated monofluoride and the saturated gem-difluoride derivatives of the acetylenic hydrocarbons in addition to unconverted reactants, passes via line 8 to hydrogen fluoride recovery unit 9 where unreacted hydrogen fluoride is removed and returned to storage 4 via line 10. The remainder of the reaction effluent which is substantially free of hydrogen fluoride passes from unit 9 via line 11 to condenser 12 which is maintained at a temperature such that the hydrofluorocarbons are condensed. The temperature in this condenser is maintained within relatively narrow limits, dependent upon the acetylene used, since the boiling point of the hydrofluorocarbons is usually only a few degrees above the solidification point of the acetylenic hydrocarbon. Thus, the temperature within the condenser is maintained at or below the temperature at which the hydrofluorocarbons are condensed but above the temperature at which the acetylenic hydrocarbon is solidified. The specific temperature limits are dependent upon the particular acetylenic hydrocarbon that is used in the process. By condensing the hydrofluorocarbons in condenser 12 the major portion of the unconverted acetylenic hydrocarbon is removed from the hydrofluorocarbons, and the acetylenic hydrocarbon may be recycled via lines 13 and 2.

The liquid condensate from condenser 12 which contains essentially a mixture of unsaturated monofluoride and gem-difluoroalkane and a relatively minor amount of dissolved acetylenic hydrocarbon is removed from condenser 12 via line 14, to low temperature fractionator 15. The dissolved acetylenic hydrocarbon passes overhead via line 16, and it is recycled along with the acetylenic hydrocarbon in lines 13 and 2. Unsaturated monofluoride is withdrawn from fractionator 15 via line 17 as the principal reaction product, and the bottoms product from fractionator 15 which contains essentially gem-difluoroalkane is withdrawn via line 18. This bottoms product passes via line 18 to mixing apparatus 19 where it is admixed with acetylenic hydrocarbon drawn from line 2, and the thus-produced mixture is introduced into reactor 7 via line 20.

In an alternative embodiment the two reaction mixtures, viz. the acetylenic hydrocarbon-hydrogen fluoride mixture and the acetylenic hydrocarbon-gem-difluoroalkane mixture, are introduced to reactor 7 at the same point via line 20. Then the acetylenic hydrocarbon-hydrogen fluoride mixture passes via lines 6A and 20 instead of via line 6, and the flow rates of the two reaction mixtures are maintained within the optimum limits by adjusting the rate of feed of either the hydrogen fluoride in line 6A or the gem-difluoroalkane in line 18.

Compensation for fluctuations in the quantity of gem-difluoroalkane is made by introducing a surge tank 21 in line 18, if desired. However, we have found that such compensation can be effected advantageously, as described above, by adjustment in the point of entrance of line 6, carrying the acetylenic hydrocarbon-hydrogen fluoride feed stream, into the reactor. When the steady state has been attained fluctuations in the volume of recycle streams are usually small and further adjustments in flow rates are generally unnecessary.

A principal advantage of our invention lies in the efficient conversion of acetylenic hydrocarbons and hydrogen fluoride to unsaturated monofluorides using the same catalyst and a single reactor in a continuous operation. Furthermore, the catalyst may be used over extended periods of time without shutdowns for regeneration, its activity apparently being enhanced by continued use.

*Example*

An apparatus was assembled according to the arrangement shown in the diagram. Acetylene was used as the acetylenic hydrocarbon and the catalyst was activated alumina. Conditions of operation at the steady state were:

Ratio of acetylene to HF_____ 1:1.11
Ratio of 1,1-difluoroethane to acetylene__ 1:1.05
Flow rate acetylene-HF stream___v./v. hr.__ 185
Flow rate 1,1-difluoroethane-
   acetylene _____do____ 105
Temperature catalyst zone_____°F__ 600
Time operated_____hours____ 3
Conversion acetylene to vinylfluoride
                                          percent__ 95

During the operation, a sample was withdrawn from the feed to the fractionation system (line 14) and analyzed. The composition of the stream at this point was found to be 12.5 per cent dissolved acetylene, 50.2 per cent vinyl fluoride, and 37.0 per cent 1,1-difluoroethane, calculated as mol per cent.

The product stream comprised vinyl fluoride of approximately 98 per cent purity, boiling at −98 to −99° F. and having a specific gravity of 0.675 at 26° C. in a pressure cylinder. The product stream provided a yield of 85 volumes of vinyl fluoride per volume catalyst per hour based on a flow rate of 185 volumes per volume catalyst per hour of a feed stream comprising 87.5 volumes of acetylene to 97.5 volumes hydrogen fluoride.

It will be quite apparent that from the above disclosure numerous variations of our process will be obvious to those skilled in the art without going beyond the scope of our invention.

We claim:
1. A method for producing vinyl fluoride comprising, passing acetylene together with hydrogen fluoride in a mol ratio of acetylene to hydrogen fluoride within the range of 1:1 to 1:4, into a zone of a catalyst selected from the group consisting of alumina, aluminum fluoride, alumina-aluminum fluoride composite, alumina-antimony fluoride composite, alumina-cadmium fluoride composite, alumina-zinc fluoride composite and alumina-cobalt fluoride composite maintained at a temperature within the range of 350–750° F., at an intermediate point in said zone, at a flow rate of acetylene and hydrogen fluoride reactants of from 150 to 350 volumes per catalyst volume per hour, withdrawing effluents from said catalyst zone and separating 1,1-difluoroethane therefrom, passing 1,1-difluoroethane thus separated together with acetylene in a mol ratio of acetylene to 1,1-difluoroethane of from 1:1 to 3:1 into said catalyst zone at a point upstream from the said point of introduction of acetylene and hydrogen fluoride reactants, at a flow rate of from 50–150 volumes per catalyst per hour, and recovering vinyl fluoride from said effluents as a product of the process.

2. A method for producing an unsaturated monofluoride hydrocarbon derivative comprising, passing an acetylenic hydrocarbon together with hydrogen fluoride in a mol ratio of acetylenic hydrocarbon to hydrogen fluoride within the range of 1:1 to 1:4, into a zone of a catalyst selected from the group consisting of alumina, aluminum fluoride, alumina-aluminum fluoride composite, alumina-antimony fluoride composite, alumina-cadmium fluoride composite, alumina-zinc fluoride composite and alumina-cobalt fluoride composite maintained at a temperature within the range of 350–750° F., at an intermediate point in said zone, at a flow rate of acetylenic hydrocarbon and hydrogen fluoride reactants of from 150 to 350 volumes per catalyst volume per hour, withdrawing effluents from said catalyst zone and separating gem-difluoroalkane therefrom, passing gem-difluoroalkane thus separated together with acetylenic hydrocarbon in a mol ratio of acetylenic hydrocarbon to gem-difluoroalkane of from 1:1 to 3:1 into said catalyst zone at a point upstream from the said point of introduction of acetylenic hydrocarbon and hydrogen fluoride reactants, at a flow rate of from 50-150 volumes per catalyst volume per hour, and recovering an unsaturated fluorohydrocarbon, containing one fluoride radical per molecule, from said effluents as a product of the process.

3. The method of claim 2 wherein each said acetylenic hydrocarbon contains not more than 10 carbon atoms per molecule.

4. The method of claim 2 wherein said temperature range is 450-650° F.

5. The method of claim 1 wherein said temperature range is 450-650° F.

6. The method of claim 1 wherein said catalyst is activated alumina.

JOHN C. HILLYER.
JOSEPH F. WILSON.

REFERENCES CITED

The following references are of record in the file of this patent:

UNITED STATES PATENTS

| Number | Name | Date |
|---|---|---|
| 1,950,431 | Carothers et al. | May 13, 1934 |
| 1,996,115 | Lazier | Apr. 2, 1935 |
| 2,118,901 | Soll | May 31, 1938 |
| 2,407,701 | Jones et al. | Sept. 17, 1946 |
| 2,442,324 | Heitz et al. | May 25, 1948 |
| 2,471,525 | Hillyer et al. | May 31, 1949 |

FOREIGN PATENTS

| Number | Country | Date |
|---|---|---|
| 641,878 | Germany | Feb. 16, 1937 |
| 394,546 | France | Dec. 27, 1944 |